(12) United States Patent
Chen et al.

(10) Patent No.: US 9,794,073 B2
(45) Date of Patent: Oct. 17, 2017

(54) INFORMATION PROCESSING SYSTEM AND SEMICONDUCTOR DEVICE

(71) Applicant: KABUSHIKI KAISHA TOSHIBA, Tokyo (JP)

(72) Inventors: Jiezhi Chen, Kanagawa (JP); Tetsufumi Tanamoto, Kanagawa (JP); Yuichiro Mitani, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 142 days.

(21) Appl. No.: 14/877,394

(22) Filed: Oct. 7, 2015

(65) Prior Publication Data

US 2016/0188908 A1 Jun. 30, 2016

(30) Foreign Application Priority Data

Dec. 26, 2014 (JP) ................................. 2014-266125

(51) Int. Cl.
*G06F 21/00* (2013.01)
*H04L 9/32* (2006.01)
*G06F 21/73* (2013.01)

(52) U.S. Cl.
CPC ............ *H04L 9/3278* (2013.01); *G06F 21/73* (2013.01)

(58) Field of Classification Search
CPC .................................................. H04L 9/3278
See application file for complete search history.

(56) References Cited

U.S. PATENT DOCUMENTS

| 6,697,035 B2* | 2/2004 | Sugahara | G09G 3/2011 345/31 |
|---|---|---|---|
| 6,760,472 B1* | 7/2004 | Takeda | G06K 7/10544 235/380 |
| 2002/0142697 A1* | 10/2002 | Yamagata | H01L 51/52 445/24 |
| 2002/0167849 A1* | 11/2002 | Ohbayashi | G11C 29/50 365/189.09 |
| 2005/0240814 A1* | 10/2005 | Sasakura | G01R 31/3004 714/14 |
| 2007/0152920 A1* | 7/2007 | Yamashita | G09G 3/3233 345/76 |
| 2009/0309646 A1* | 12/2009 | Kobayashi | G06F 7/588 327/355 |

(Continued)

FOREIGN PATENT DOCUMENTS

| JP | 2000-235636 | 8/2000 |
|---|---|---|
| JP | 2012-073954 A | 4/2012 |

(Continued)

*Primary Examiner* — Morshed Mehedi
(74) *Attorney, Agent, or Firm* — Finnegan, Henderson, Farabow, Garrett & Dunner, L.L.P.

(57) ABSTRACT

According to an embodiment, an information processing system includes a time constant processor and a pattern generator. The time constant processor binarizes values indicating a plurality of unit circuits each including a gate insulating film on the basis of a time to emission indicating a time from when a defect in the gate insulating film captures a carrier in a channel current caused to flow by application of a gate voltage to the unit circuits to when the defect emits the carrier. The pattern generator generates a pattern unique to the unit circuits using the values indicating the respective unit circuits binarized by the time constant processor.

10 Claims, 20 Drawing Sheets

(56) References Cited

U.S. PATENT DOCUMENTS

| | | | | |
|---|---|---|---|---|
| 2010/0155707 A1* | 6/2010 | Anthopoulos | ......... | B82Y 10/00 257/40 |
| 2012/0020145 A1 | 1/2012 | Huber et al. | | |
| 2012/0324241 A1* | 12/2012 | Oshida | ................... | G06F 21/73 713/189 |
| 2013/0346825 A1* | 12/2013 | Marukame | ......... | H03M 13/1102 714/758 |
| 2014/0070212 A1* | 3/2014 | Fujiwara | ............ | G06K 19/0722 257/48 |
| 2014/0353770 A1* | 12/2014 | Kamei | .............. | H01L 27/14612 257/408 |
| 2014/0372671 A1 | 12/2014 | Tanamoto et al. | | |

FOREIGN PATENT DOCUMENTS

| | | |
|---|---|---|
| JP | 2013-5314 | 1/2013 |
| JP | 2014-53064 | 3/2014 |
| JP | 2015-1761 | 1/2015 |

* cited by examiner

FIG.8

|    | X0 | X1 | X2 | X3 | X4 | X5 | X6 | X7 |
|----|----|----|----|----|----|----|----|----|
| Y0 |    |    |    |    |    |    |    |    |
| Y1 |    |    |    |    |    |    |    |    |
| Y2 |    |    |    |    |    |    |    |    |
| Y3 |    |    |    |    |    |    |    |    |
| Y4 |    |    |    |    |    |    |    |    |
| Y5 |    |    |    |    |    |    |    |    |
| Y6 |    |    |    |    |    |    |    |    |
| Y7 |    |    |    |    |    |    |    |    |

INFORMATION PROCESSING SYSTEM AND SEMICONDUCTOR DEVICE

CROSS-REFERENCE TO RELATED APPLICATIONS

This application is based upon and claims the benefit of priority from Japanese Patent Application No. 2014-266125, filed on Dec. 26, 2014; the entire contents of which are incorporated herein by reference.

FIELD

Embodiments described herein relate generally to an information processing system and a semiconductor device.

BACKGROUND

With the refinement in semiconductor technologies, non-volatile memories, for example, have been designed to be lighter in weight, achieve a higher-speed operation, and require less power consumption. As a result, the market for large-capacity non-volatile memory systems has significantly expanded, and information management in the large-capacity memory systems has become more important.

The refinement of non-volatile memories gradually increases variations in single devices, making it difficult to ensure the reliability of the memories. The variations, however, can be used to improve the security. The variations in non-volatile memory devices are determined by various factors a part of which is physical characteristics that are generated in a process, already determined in shipping, and hard to duplicate. For example, the smaller the area of a device becomes, the larger an influence of a single defect exerting on the device becomes. Examples of a technology for using an individual difference of a semiconductor device for authentication include, but are not limited to, a physical unclonable function (PUF).

The conventional security system that uses the variations in semiconductor devices, however, may possibly be inadequate.

BRIEF DESCRIPTION OF THE DRAWINGS

FIG. 8 is a schematic of a semiconductor device having a plurality of unit circuits arranged in an array;

DETAILED DESCRIPTION

According to an embodiment, an information processing system includes a time constant processor and a pattern generator. The time constant processor binarizes values indicating a plurality of unit circuits each including a gate insulating film on the basis of a time to emission indicating a time from when a defect in the gate insulating film captures a carrier in a channel current caused to flow by application of a gate voltage to the unit circuits to when the defect emits the carrier. The pattern generator generates a pattern unique to the unit circuits using the values indicating the respective unit circuits binarized by the time constant processor.

First, the background of the present invention will be described. With a future increase in the need for information management, the importance of a security system, such as an information management memory system, will increase. The conventional security system for a non-volatile memory system or a logic circuit system, however, may possibly be inadequate. To enhance the security using a PUF, for example, the following factors are required: peculiarity (e.g., a unique fingerprint), environmental independence (e.g., being independent of temperature), and deterioration independence (e.g., being independent of device deterioration).

Figure 1:
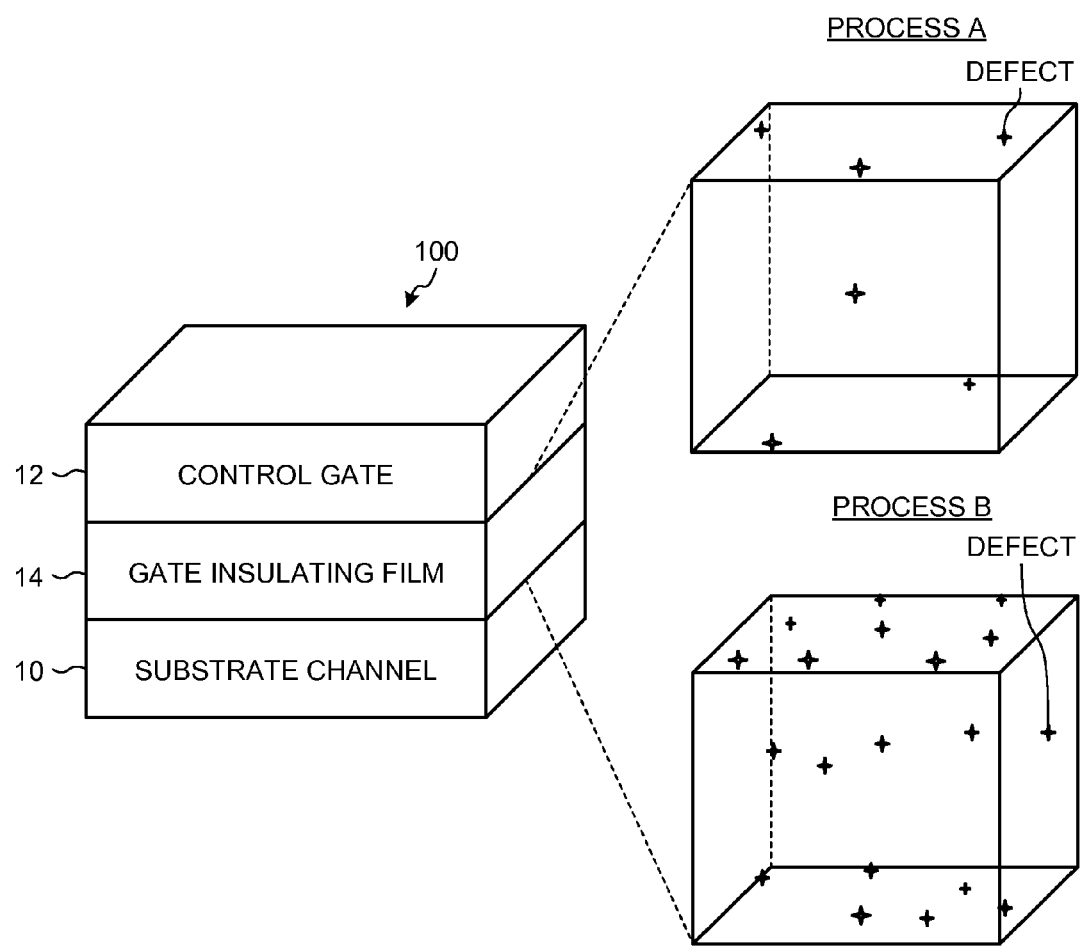
FIG. 1 is a schematic of a unit circuit.

The following describes a processing procedure performed by an information processing system and a semiconductor device according to an embodiment with reference to schematics, for example. FIG. 1 is a schematic of a unit circuit 100, such as a non-volatile memory cell or a metal-oxide-semiconductor (MOS) transistor including a gate insulating film. The unit circuit 100 serves as a basic configuration of a semiconductor device and includes a substrate channel 10, a control gate (gate) 12, and a gate insulating film 14.

The quality of the gate insulating film 14 greatly affects the reliability of the semiconductor device. If the gate insulating film 14 is made by different processes like a process A and a process B, for example, the density and the position of defects formed in the gate insulating film and the depth of defect energy are not uniform. Even if the gate insulating film 14 is made by the same process, it is impossible to uniformize the distribution of defects in the gate insulating films 14 of a plurality of unit circuits 100 having the same configuration. The distribution of defects are affected by various processes, such as the type of the substrate, a plane orientation, a cleaning process before formation of the gate insulating film 14, a forming process of the control gate 12, and high-temperature annealing, which is a post-process.

Figure 2A:
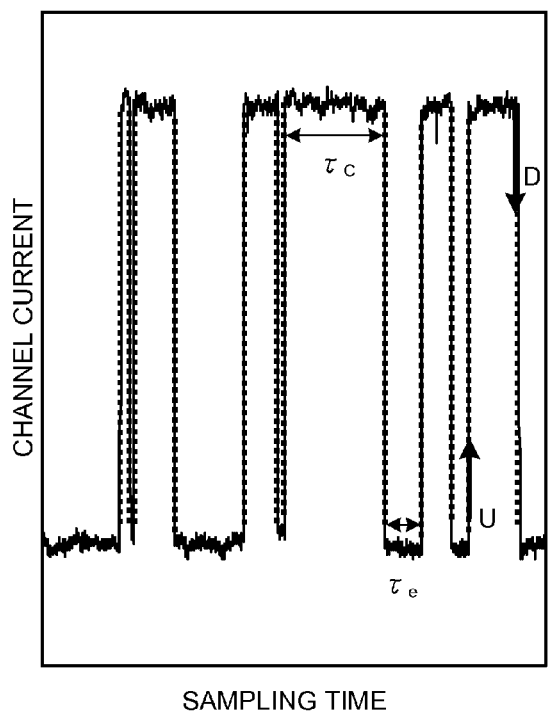
FIG. 2A is a graph of a state where a channel current changes because of a defect.
Figure 2C:
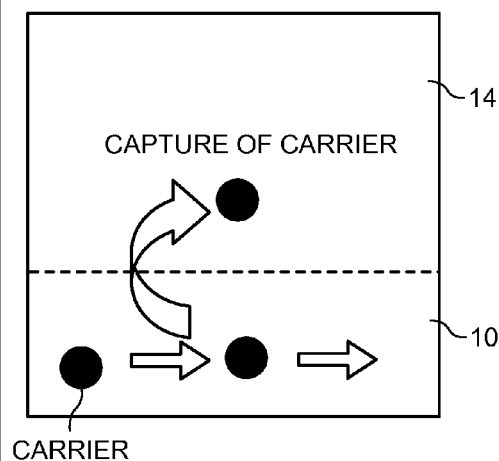
FIGS. 2B and 2C are schematics corresponding thereto.
Figure 2B:
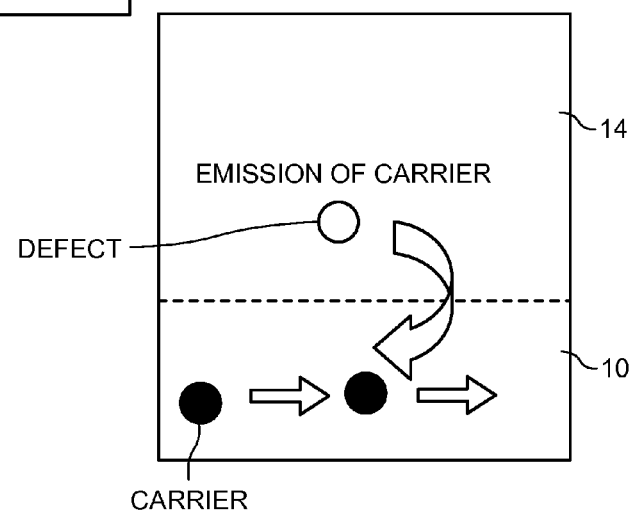

FIG. 2A is a graph of a state where a channel current changes (oscillates) because of a defect in the gate insulating film 14, and FIGS. 2B and 2C are schematics corresponding thereto. In FIG. 2, a channel current is generated by application of a constant voltage to the control gate 12 of a semiconductor transistor (e.g., a metal-oxide-semiconductor field-effect transistor (MOSFET)). In a case where a defect is present in the gate insulating film 14, when a channel Fermi level caused by the applied voltage (electric field) is substantially equal to the defect energy, the channel current can oscillate. This phenomenon is called random telegraph noise (RTN).

The following briefly describes the physical mechanism of RTN. A defect can capture (fetch) a carrier flowing in the channel current. When the defect captures one carrier, the electric field applied to the gate insulating film 14 is shifted, thereby suppressing the channel current. By contrast, when the defect emits the captured carrier, the channel current is restored.

The arrow D illustrated in FIG. 2A, for example, indicates the channel current reduced by the defect of the gate insulating film 14 capturing a carrier as illustrated in FIG. 2C. The arrow U illustrated in FIG. 2A indicates the channel current restored by the defect of the gate insulating film 14 emitting the carrier as illustrated in FIG. 2B.

In the following description, a time from when a defect captures a carrier in the channel current to when the defect emits is defined as a time to emission τe, whereas a time from when the defect emits a carrier in the channel current to when the defect captures a carrier is defined as a time to capture τc.

Figure 3:
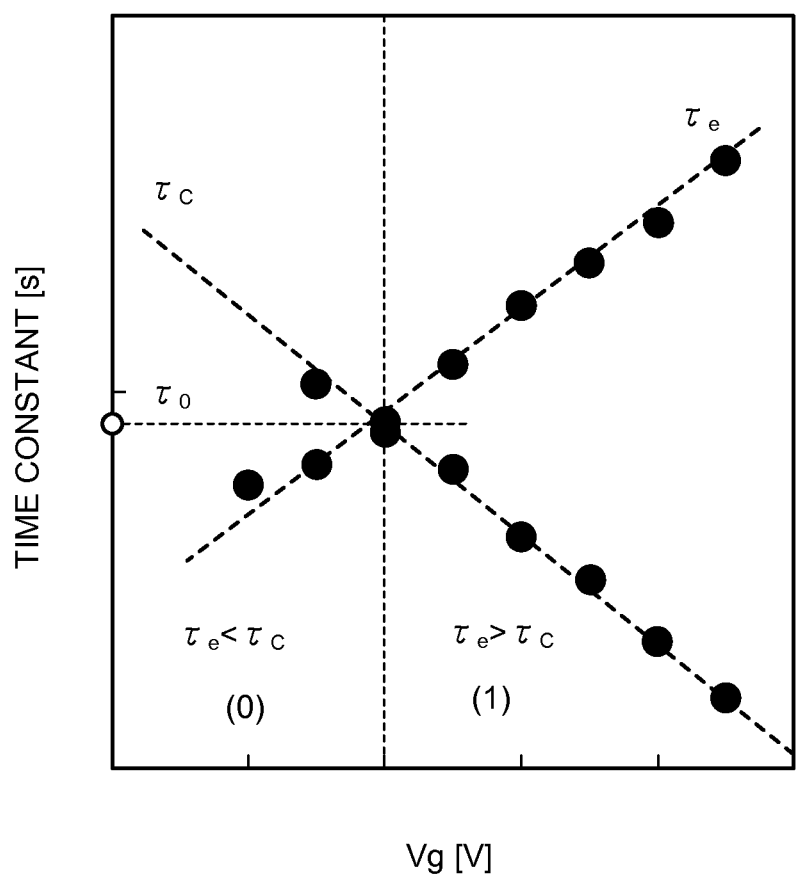
FIG. 3 is a diagram of dependence of a time to emission and a time to capture on a gate voltage and a first exemplary condition for binarizing a value indicating the unit circuit.

FIG. 3 is a diagram of dependence of the time to emission τe and the time to capture τc on a gate voltage (Vg) and a first exemplary condition for binarizing a value indicating the unit circuit 100 (value allocated to each unit circuit 100). In FIG. 3, the abscissa indicates the gate voltage applied to the control gate 12, and the ordinate indicates the time to emission τe and the time to capture τc.

An increase in the gate voltage makes a defect that captures a carrier flowing through the substrate channel 10 more likely to capture the carrier and less likely to emit it, thereby making τc shorter and making τe longer. An increase in the gate voltage, however, makes a defect that captures a carrier existing on the gate side more likely to emit the carrier and less likely to capture a carrier, thereby making τe shorter and making τc longer.

When a predetermined gate voltage is applied to the control gate 12, τe is equal to τc. In the example illustrated in FIG. 3, the area on the left side (τe≤τc) is defined as "0", whereas the area on the right side (τe>τc) is defined as "1". In other words, the unit circuit 100 is binarized with "0" or "1" depending on the magnitude relation between τe and τc at the predetermined gate voltage.

Figure 4:
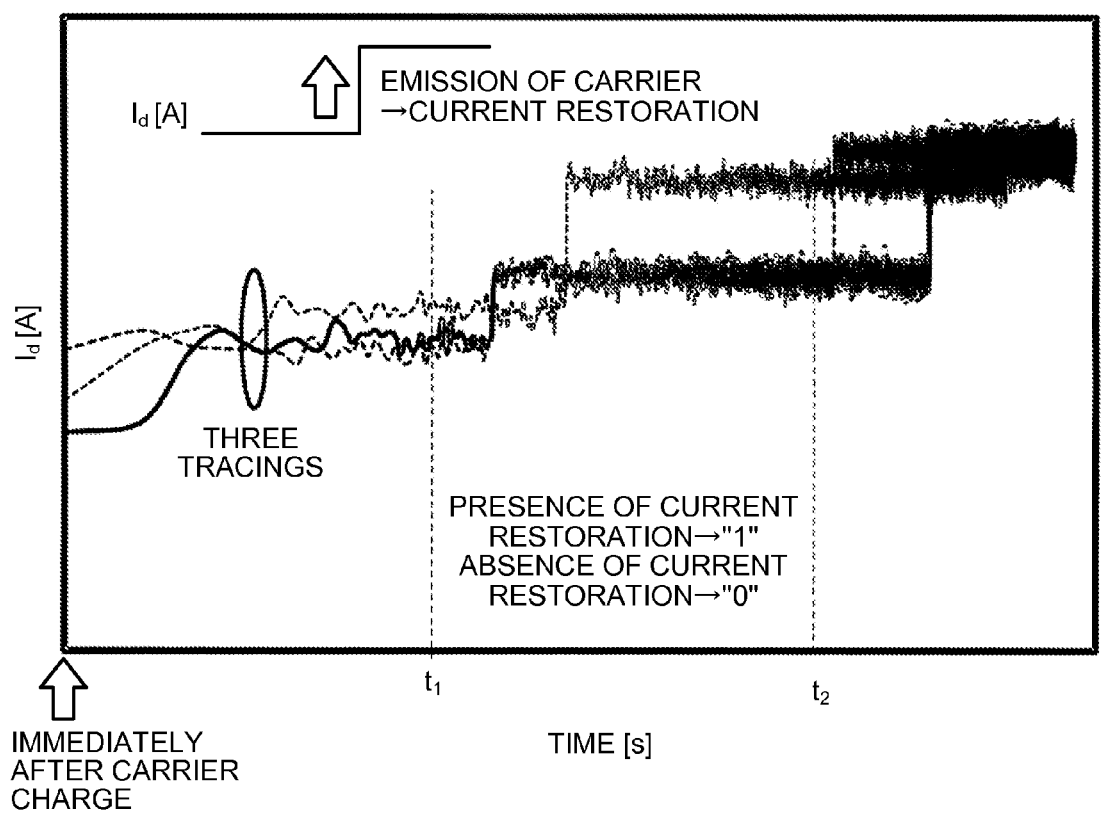
FIG. 4 is a diagram of a second exemplary condition for binarizing the value indicating the unit circuit.

FIG. 4 is a diagram of a second exemplary condition for binarizing the value indicating the unit circuit 100 (value allocated to each unit circuit 100). In FIG. 4, the abscissa indicates passage of time, and the ordinate indicates a transient channel current (Id). As illustrated in FIG. 4, each defect in the gate insulating film 14 is caused to temporarily capture a carrier (carrier charge). Each defect emits the carrier with the passage of time, thereby restoring the channel current in phases.

More specifically, a charging voltage (high gate voltage) is applied to the control gate 12, thereby causing a plurality of defects in the gate insulating film 14 to capture respective carriers. Subsequently, the voltage applied to the control gate 12 is switched to a sensing voltage for monitoring the channel current (low gate voltage close to a threshold voltage) to measure temporal change of the channel current.

With this method, the defects are caused to capture respective carriers by application of the high gate voltage and to gradually emit them by switching of the applied voltage to the low gate voltage. Thus, the transient channel current is restored in phases.

In a case where the gate insulating film 14 includes one defect, the transient channel current has only two current levels. By contrast, in a case where the gate insulating film 14 includes N defects, the transient channel current has N+1 current levels. Tracing the transient channel current a plurality of times improves the accuracy of detection of the time when each defect emits the carrier.

By setting a constant charging voltage and a constant sensing voltage, it is possible to compare the transient channel current in a predetermined time. It is assumed that the channel current at t1 in FIG. 4 is compared with that at t2, for example. If a change in current level (restoration) is present, "1" is allocated; whereas if no change in current level (restoration) is present, "0" is allocated. In other words, the constant charging voltage and the constant sensing voltage are set for the unit circuit 100, and the unit circuit 100 is binarized with "0" or "1" depending on whether the carriers captured by the defects are emitted in a predetermined period.

Figure 5:
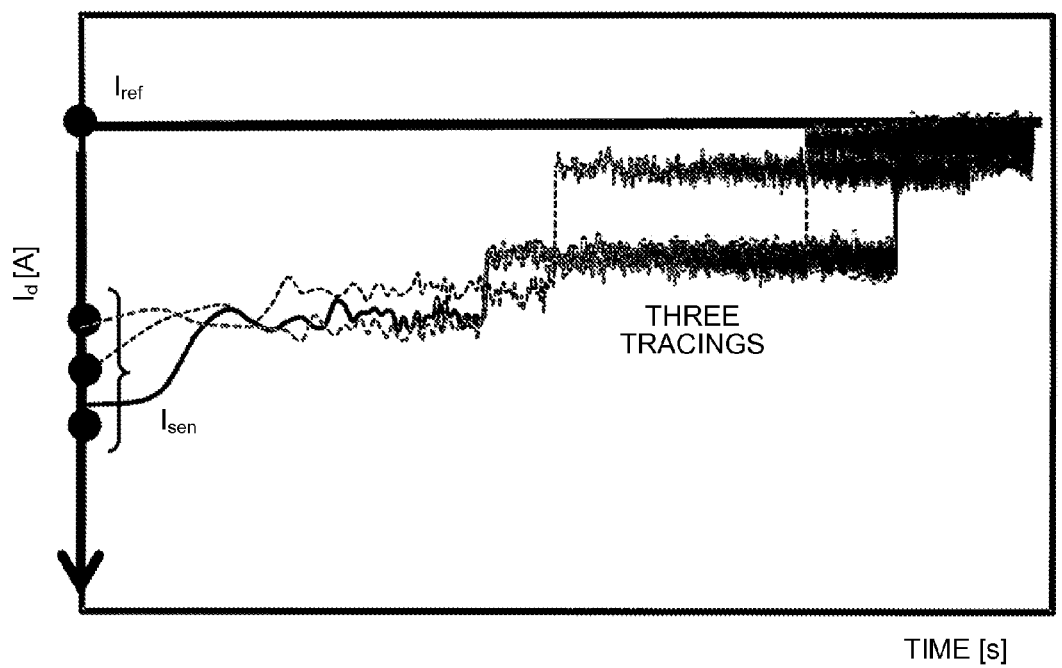
FIG. 5 is a diagram of a third exemplary condition for binarizing the value indicating the unit circuit.
Figure 6:
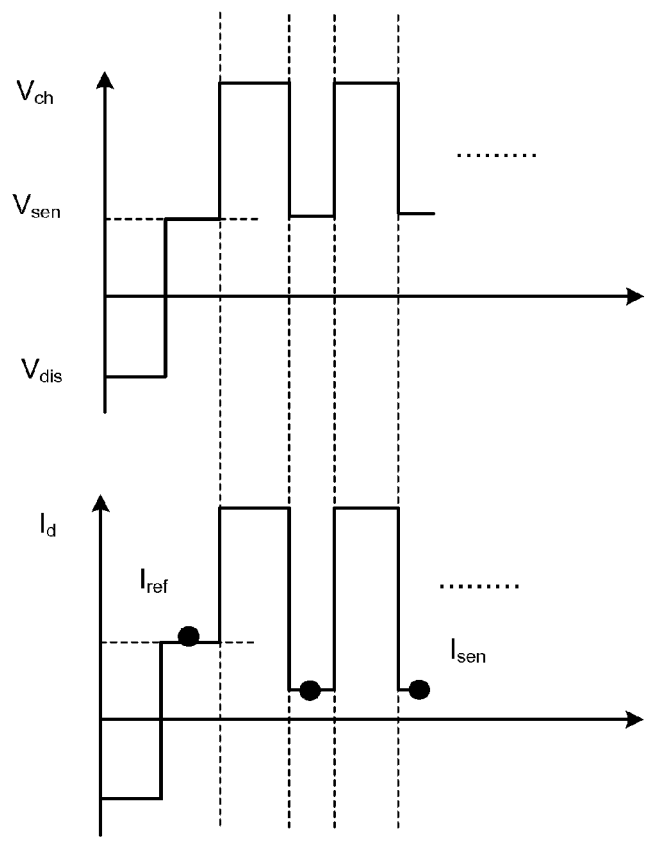
FIG. 6 is a graph comparing a voltage applied to a control gate with a transient channel current.

FIG. 5 is a diagram of a third exemplary condition for binarizing the value indicating the unit circuit 100 (value allocated to each unit circuit 100). In FIG. 5, the abscissa indicates passage of time, and the ordinate indicates the transient channel current (Id). FIG. 6 is a graph comparing the voltage applied to the control gate 12 with the transient channel current.

First, a discharge voltage (Vdis) is applied to the control gate 12 such that each defect emits a carrier. Next, a sensing voltage for monitoring the transient channel current (low gate voltage close to a threshold voltage) is applied to the control gate 12 to measure a reference channel current (Iref) once. Subsequently, a charging voltage (high gate voltage) is applied, thereby causing a plurality of defects in the gate insulating film 14 to capture respective carriers. Immediately after this, a momentary channel current (Isen) at the sensing voltage is measured.

In this method, the application of the high gate voltage causes the defects to capture respective carriers, thereby making Isen lower than Iref. If (Iref−Isen)/Iref is equal to or larger than 1%, it is determined that a defect is present, and the value allocated to the unit circuit 100 is determined to be "1". By contrast, if (Iref−Isen)/Iref is smaller than 1%, it is determined that no defect is present, and the value allocated to the unit circuit 100 is determined to be "0". In other words, the unit circuit 100 is binarized with "0" or "1" depending on the magnitude relation between a predetermined value and a difference between the channel current obtained when the defects capture the respective carriers and the channel current obtained when the defects emit the respective carriers.

Figure 7:
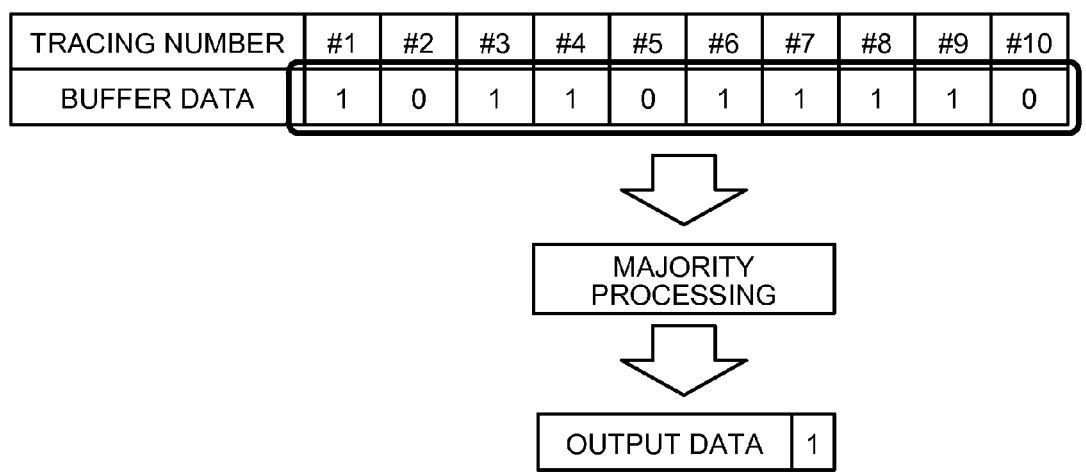
FIG. 7 is a diagram of a process of performing majority processing to output binary data.

FIG. 7 is a diagram of a process of performing majority processing on data obtained by performing ten tracings under the second exemplary condition illustrated in FIG. 4 to output binary data. In the example illustrated in FIG. 7, if phased restoration is present in the transient channel current in the predetermined time, "1" is allocated; whereas if no restoration is present, "0" is allocated.

In a case where the data on the transient channel current subjected to ten tracings is "1011011110", for example, the number of times of "1" is seven, and the number of times of "0" is three. In this case, "1" is output as output data as a result of majority processing. As the number of times of tracing increases, the accuracy increases, but the processing time increases. In view of the accuracy and the time, the tracing is preferably performed a small number of times (e.g., three to five times).

Figure 8:
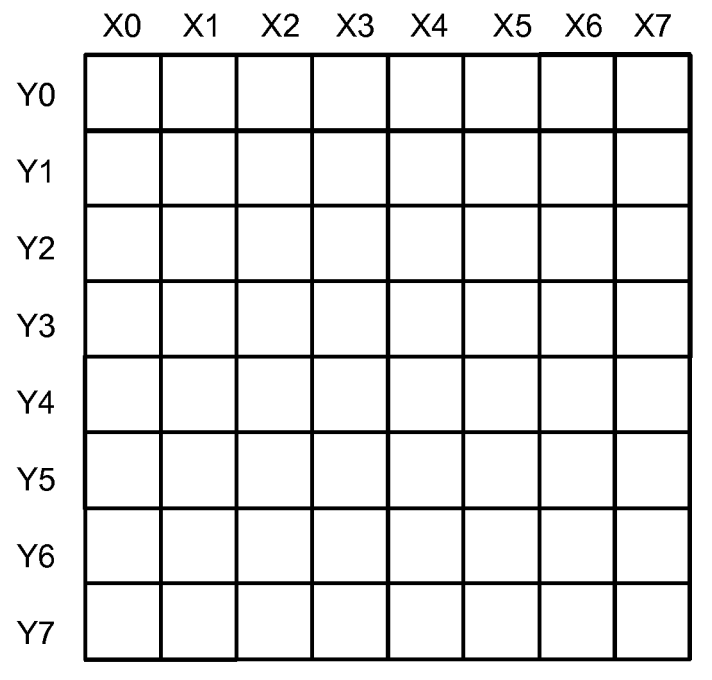

FIG. 8 is a schematic of a semiconductor device having a plurality of unit circuits 100 arranged in an array. The 64 unit circuits 100 illustrated in FIG. 8, for example, each serve as a PUF dedicated region provided with "0" or "1" depending on the defect. As described above, the semiconductor device may be composed of a plurality of MOS transistors or a plurality of non-volatile memory cells (e.g., a NAND flash memory and a ReRAM).

Figure 9:
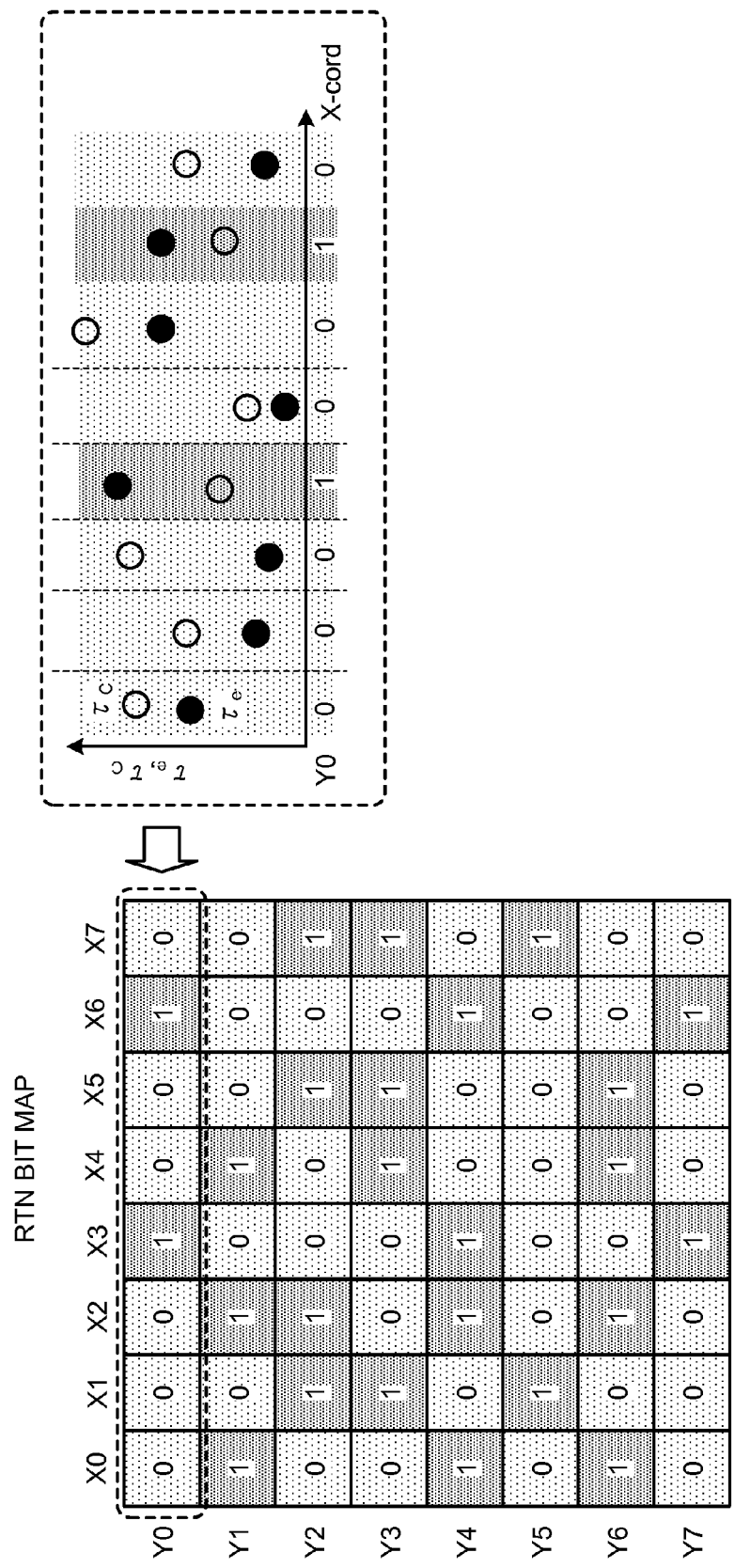
FIG. 9 is a diagram of a result of binarization of the semiconductor device illustrated in FIG. 8 under the first exemplary condition.

FIG. 9 is a diagram of a result of binarization of the semiconductor device illustrated in FIG. 8 under the first exemplary condition illustrated in FIG. 3. The predetermined gate voltage is applied to the unit circuits 100 arranged in an array to measure the channel current, whereby τe and τc are extracted. Subsequently, τe and τc are compared to binarize the unit circuits 100.

The array of the binarized unit circuits 100 corresponds to a pattern unique to the semiconductor device. The values allocated to the unit circuits 100 in the Y0 row from the X0 to the X7 columns are 0, 0, 0, 1, 0, 0, 1, and 0. Thus, the data pattern of the Y0 row is determined to be 00010010. The data patterns of Y1 to Y7 are also generated in the same manner, whereby an X-Y two-dimensional pattern is generated.

Figure 10:
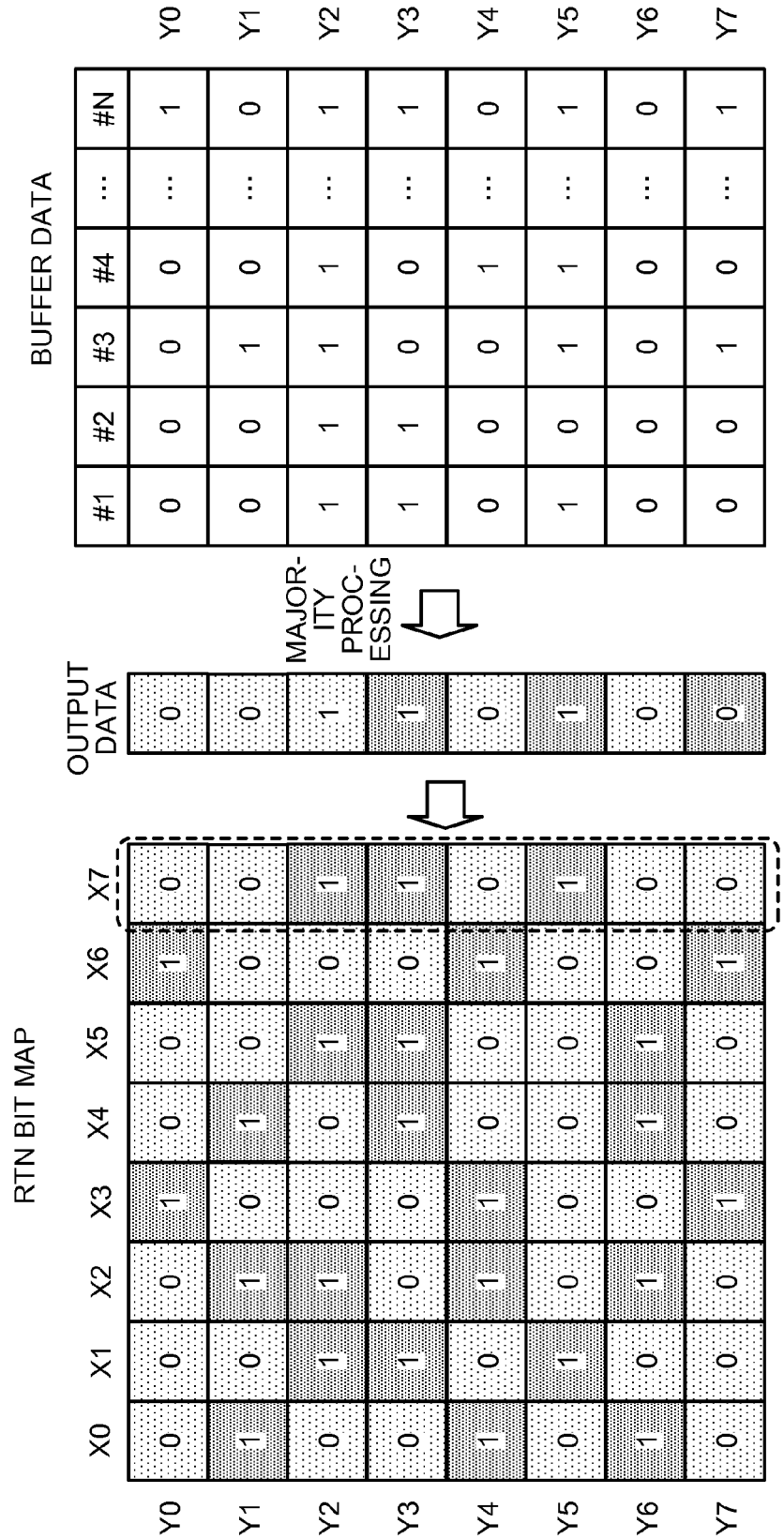
FIG. 10 is a diagram of a result of binarization of the semiconductor device illustrated in FIG. 8 under the second exemplary condition.

FIG. 10 is a diagram of a result of binarization of the semiconductor device illustrated in FIG. 8 under the second exemplary condition illustrated in FIG. 4. The charging voltage (high gate voltage) is applied to the control gate 12 in each of the unit circuits 100 arranged in an array, thereby causing a plurality of defects in the gate insulating film 14 to capture respective carriers. Subsequently, the voltage applied to the control gate 12 is switched to the sensing voltage for monitoring the channel current (low gate voltage close to the threshold voltage) to measure temporal change of the channel current. The constant charging voltage and the constant sensing voltage are set for the unit circuits 100, and the unit circuits 100 are each binarized with "0" or "1" depending on whether the carriers captured by the defects are emitted in the predetermined period.

In a case where the accuracy of binarization is emphasized, the unit circuits 100 are binarized by tracing the channel current a plurality of times and then performing majority processing. It is assumed that the channel current is traced N times, and the data on the unit circuits 100 in the X7 column from the Y0 to the Y7 rows is 0, 0, 1, 1, 0, 1, 0, and 0, for example. In this case, the data pattern of the X7 column is determined to be 00110100 by the majority processing. The data patterns of X0 to X6 are also generated in the same manner, whereby an X-Y two-dimensional pattern is generated.

Figure 11:
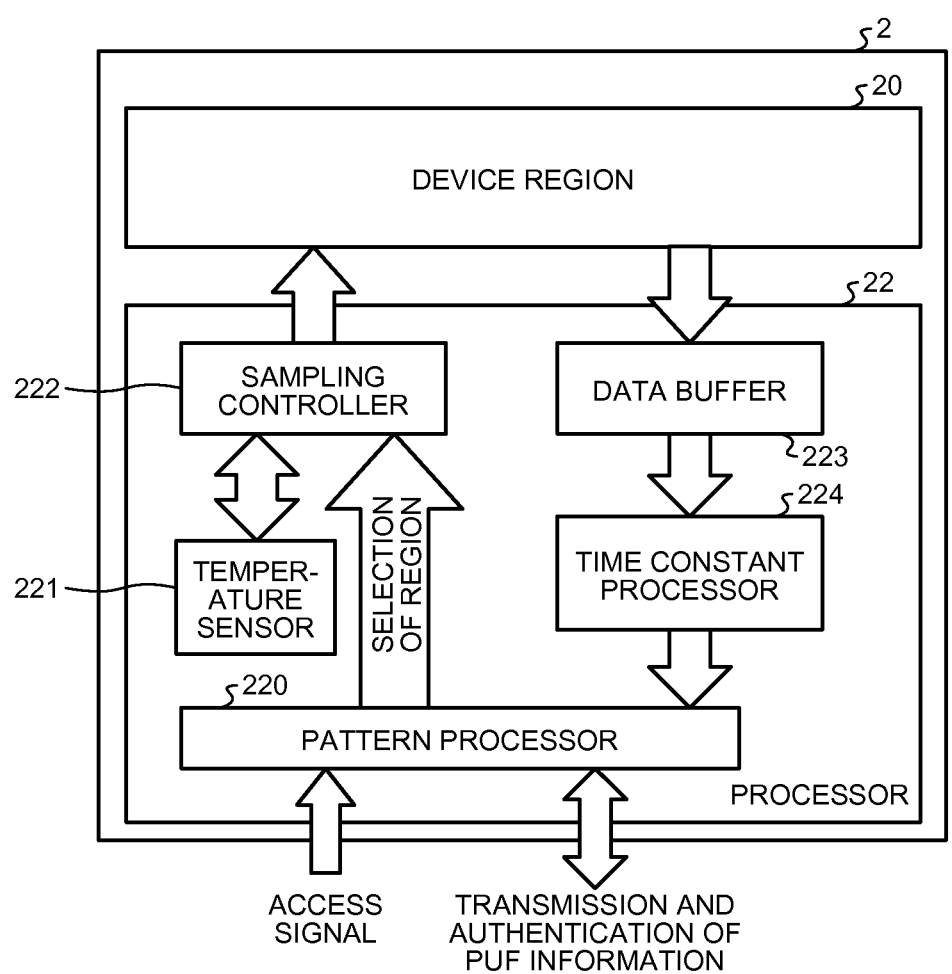
FIG. 11 is a diagram of an exemplary configuration of a semiconductor device according to an embodiment.

The following describes the configuration of the semiconductor device and the information processing system according to the embodiment that performs the processing procedure described above. FIG. 11 is a diagram of an exemplary configuration of a semiconductor device 2 according to the embodiment. The semiconductor device 2 includes a device region 20 including the unit circuits 100, and a processor 22. To generate a pattern unique to the semiconductor device 2, the device region 20 is provided with PUFs of the respective unit circuits 100.

The processor 22 includes a pattern processor (pattern generator) 220, a temperature sensor (temperature detector) 221, a sampling controller (condition controller) 222, a data buffer (reading unit) 223, and a time constant processor 224.

In response to an access signal received from the outside, for example, the pattern processor 220 outputs a signal (region selection signal) for selecting a region in the device region 20 for generating a pattern (PUF pattern) unique to the semiconductor device 2 to the sampling controller 222. The access signal may include a user password and information used to select conditions for generating the PUF pattern, for example.

The temperature sensor 221 detects temperature (ambient temperature) around the semiconductor device 2 and outputs it to the sampling controller 222.

The sampling controller 222 performs control, on the region selected by the pattern processor 220, to change the conditions for generating the PUF pattern (conditions for binarizing each unit circuit 100) including a sampling time and a sampling rate depending on the ambient temperature received from the temperature sensor 221. The sampling controller 222, for example, determines a sampling voltage applied to the device region 20 or the charging voltage and the sensing voltage, and the sampling time. The sampling controller 222 controls a timing to measure (sample) the channel current in each unit circuit 100, for example. As the ambient temperature increases, the sampling controller 222 makes the sampling time and the sampling rate shorter; whereas as the ambient temperature decreases, the sampling controller 222 makes the sampling time and the sampling rate longer.

The data buffer 223 temporarily stores therein each channel current in the device region 20 measured under the control of the sampling controller 222. The data buffer 223 may function as a reading unit that reads each channel current from the device region 20.

The time constant processor 224 performs the processing described in the first exemplary condition, the second exemplary condition, or the third exemplary condition for binarizing the value indicating the unit circuit 100. Thus, the time constant processor 224 allocates the values to the respective unit circuits 100, thereby binarizing them. In other words, the time constant processor 224 extracts τe and τc or acquires channel current values Id1 and Id2 in a predetermined period (e.g., a period between t1 and t2), thereby binarizing the unit circuits 100.

The pattern processor 220 receives data binarized by the time constant processor 224, thereby generating a pattern (PUF pattern) unique to the semiconductor device 2.

The processing performed by the time constant processor 224 and the pattern processor 220 is not limited to the processing described above. The time constant processor 224, for example, may extract τe and τc, and the pattern processor 220 may binarize the unit circuits 100 and generate a PUF pattern.

As described above, the processor 22 generates a PUF pattern of the device region 20 according to a PUF pattern formation rule based on the first exemplary condition, the second exemplary condition, or the third exemplary condition for binarizing the values indicating the unit circuits 100. The processor 22, for example, allocates "1" to the unit circuit 100 satisfying τe≥τc and allocates "0" to the unit circuit 100 satisfying τe<τc. Alternatively, the processor 22 may allocate "1" to the unit circuit 100 satisfying Id2>Id1+ ΔId and allocate "0" to the unit circuit 100 satisfying Id2<Id1+ΔId. Here, ΔId denotes a constant current variation.

The PUF pattern generated by the processor 22 is transmitted to a security server 42, which will be described later, for example, and is used for authentication by the security server 42.

Figure 12:
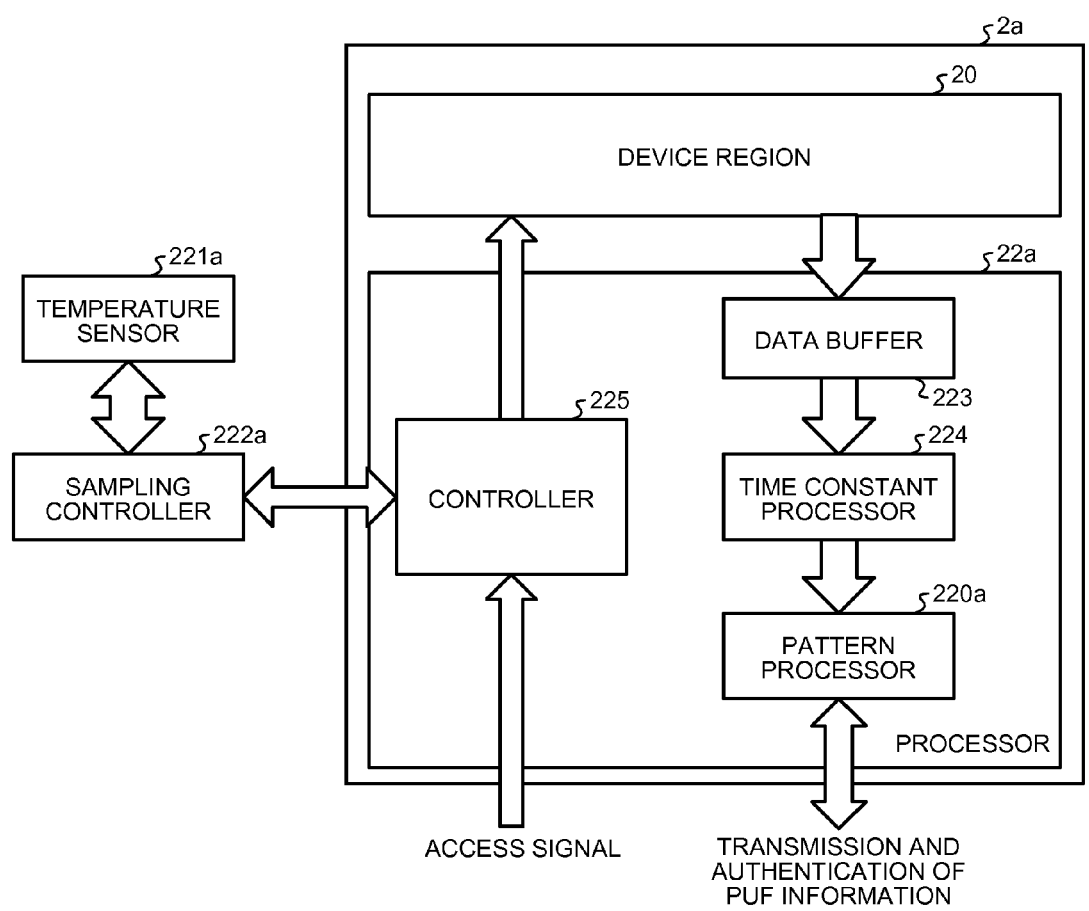
FIG. 12 is a diagram of a configuration of a modification of the semiconductor device according to the embodiment.

FIG. 12 is a diagram of a configuration of a modification (semiconductor device 2a) of the semiconductor device 2 according to the embodiment. Components substantially identical to those of the embodiment are denoted by like reference numerals. The semiconductor device 2a includes the device region 20 and a processor 22a. The semiconductor device 2a does not include the temperature sensor 221 and the sampling controller 222 included in the semiconductor device 2. A temperature sensor 221a is provided outside the semiconductor device 2a and detects temperature around the semiconductor device 2a. A sampling controller 222a is provided outside the semiconductor device 2a and has the same functions as those of the sampling controller 222.

The processor 22a includes a pattern processor 220a, a controller 225, the data buffer 223, and the time constant processor 224. The controller 225, for example, controls the sampling controller 222a in response to an access signal received from the outside. The controller 225 performs control, on the region selected by the sampling controller 222a, to change the conditions for generating a PUF pattern (conditions for binarizing each unit circuit 100) including the sampling time and the sampling rate depending on the ambient temperature detected by the temperature sensor 221a.

The pattern processor 220a receives data binarized by the time constant processor 224, thereby generating a pattern (PUF pattern) unique to the semiconductor device 2a.

Figure 13:
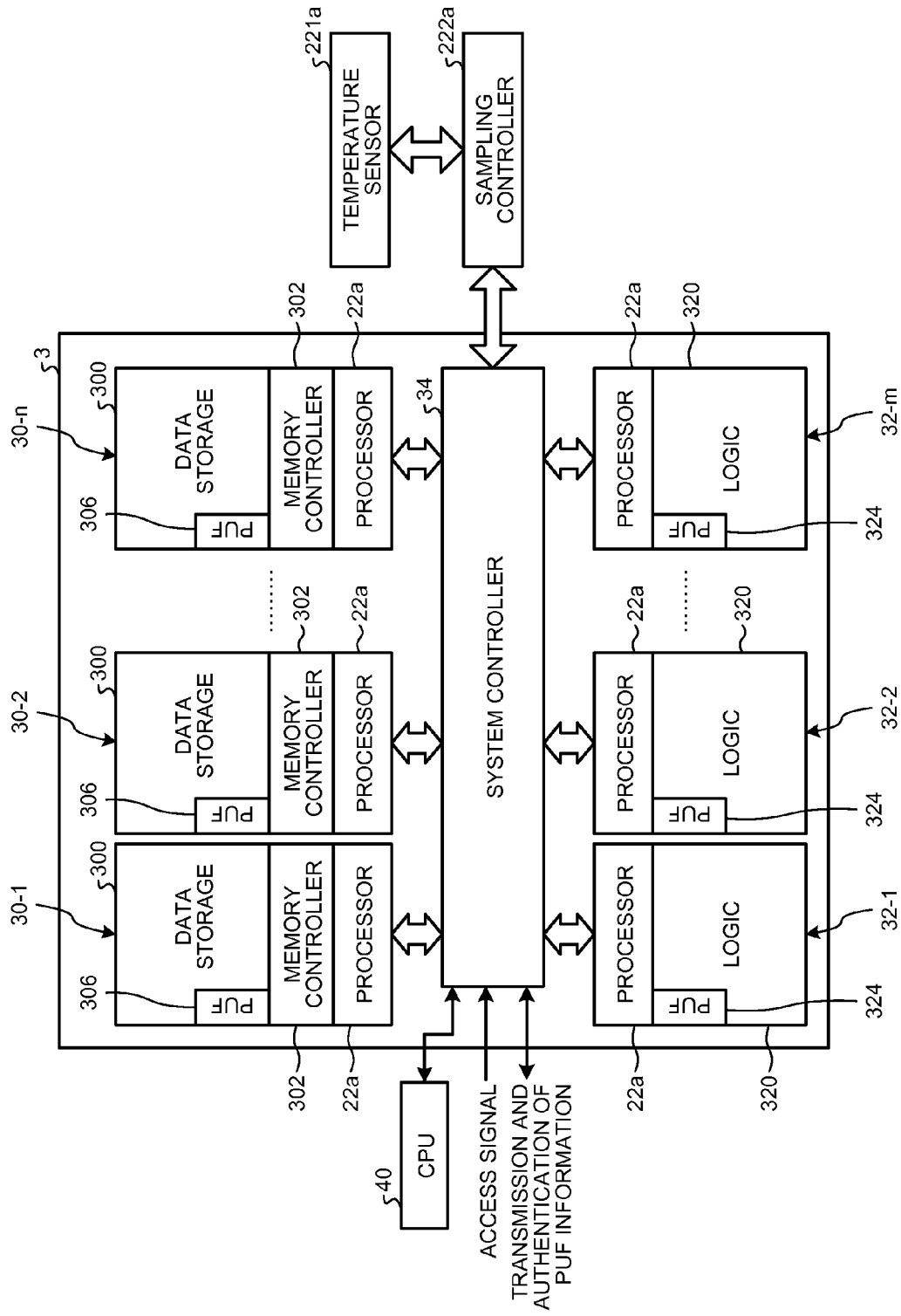
FIG. 13 is a diagram of an exemplary configuration of a semiconductor device according to the embodiment.

FIG. 13 is a diagram of an exemplary configuration of a semiconductor device 3 according to the embodiment. The semiconductor device 3 includes n non-volatile memory chips 30-1 to 30-n, m logic chips 32-1 to 32-m, and a system controller 34, for example. In other words, the semiconductor device 3 is a semiconductor system having a multi-chip sealed in one package, for example. While a central processing unit (CPU) 40, the temperature sensor 221a, and the sampling controller 222a are provided outside the semiconductor device 3, they may be included in the semiconductor device 3. In the following description, components provided in plurality like the non-volatile memory chips 30-1 to 30-n may be simply referred to as non-volatile memory chips 30, for example, if any one of them is not specified.

The non-volatile memory chips 30 each include a data storage 300, a memory controller 302, and the processor 22a. The data storage 300 has a plurality of memory cells arranged in an array. Each of the memory cells included in the data storage 300 corresponds to the unit circuit 100. A PUF 306 is a partial region of the data storage 300. The memory controller 302 controls the data storage 300. The processor 22a outputs a PUF pattern of the PUF 306 to the system controller 34.

The logic chips 32 each include a logic 320 and the processor 22a. The logic 320 has a plurality of circuits, such as NAND circuits, including a plurality of MOSFETs arranged in an array, for example. Each of the MOSFETs included in the logic 320 corresponds to the unit circuit 100.

A PUF 324 is a partial region of the logic 320. The processor 22a outputs a PUF pattern of the PUF 324 to the system controller 34.

The system controller 34 controls the sampling controller 222a and the CPU 40, for example. Thus, the system controller 34 generates PUF patterns of the respective non-volatile memory chips 30, PUF patterns of the respective logic chips 32, and a PUF pattern unique to the semiconductor device 3.

Figure 14:
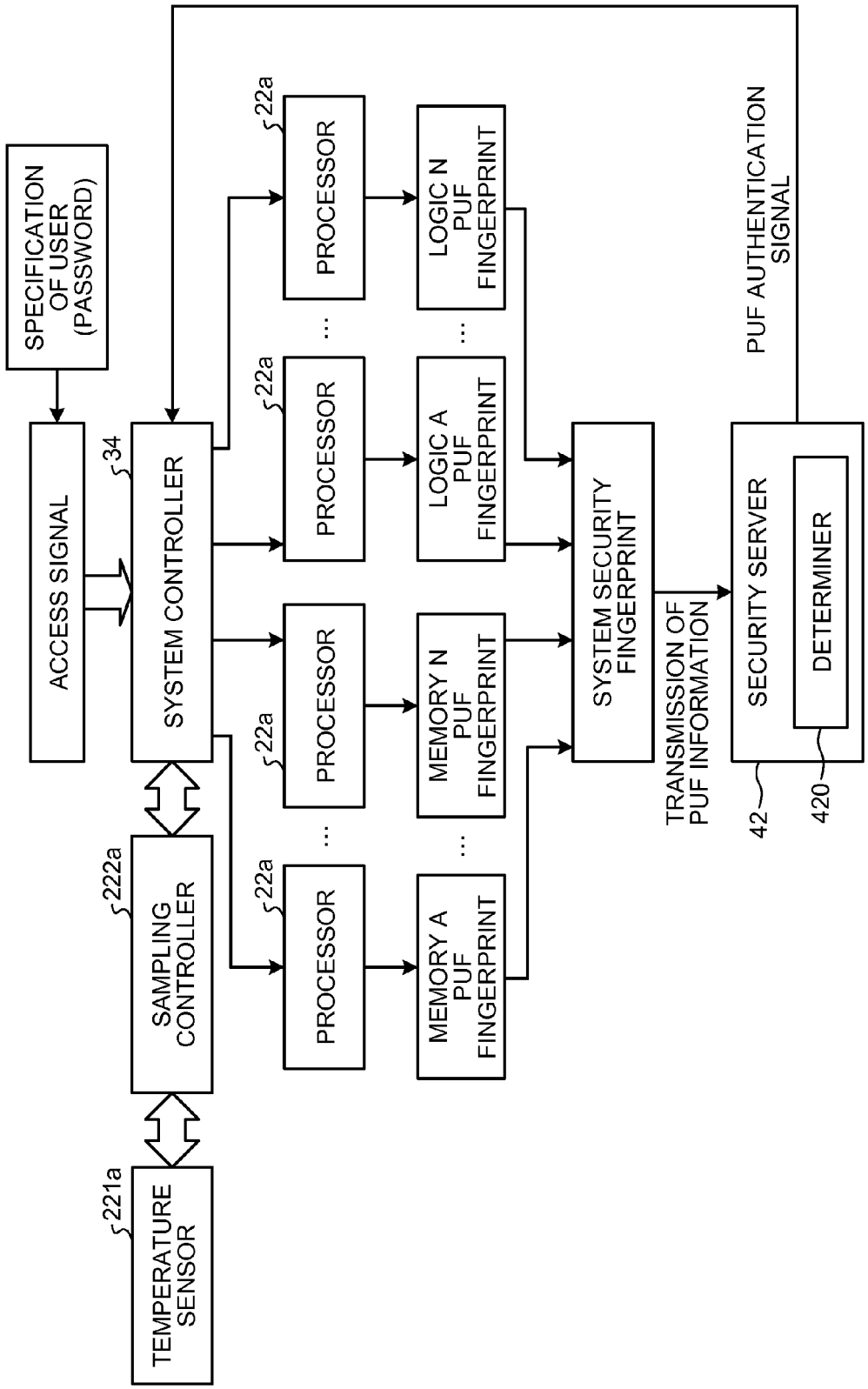
FIG. 14 is a conceptual diagram of an exemplary operation of the semiconductor device illustrated in FIG. 13.

FIG. 14 is a conceptual diagram of an exemplary operation of the semiconductor device 3 illustrated in FIG. 13. When receiving an access signal including a password or the like, the system controller 34 generates a PUF pattern based on a sampling signal received from the sampling controller 222a. The system controller 34 sequentially accesses the processors 22a of the non-volatile memory chips 30 and the logic chips 32 the PUF patterns of which are to be generated. Thus, the system controller 34 generates the PUF patterns of the respective non-volatile memory chips 30 and the PUF patterns of the respective logic chips 32. In the following description, the PUF patterns of the respective PUFs 306 may be referred to as PUF fingerprints of memories A to N, and the PUF patterns of the respective PUFs 324 may be referred to as PUF fingerprints of logics A to N.

The system controller 34 generates a pattern unique to the semiconductor device 3 (system security fingerprint) using the PUF fingerprints of the memories A to N and the PUF fingerprints of the logics A to N, for example, and transmits it to the security server 42. The security server 42 can communicate with the semiconductor device 3 and includes a determiner 420. The determiner 420 determines whether the system security fingerprint is identical to a predetermined pattern (system security fingerprint of the semiconductor device 3 registered (stored) in advance). In other words, the security server 42 performs authentication using the system security fingerprint. If the security server 42 appropriately authenticates the system security fingerprint of the semiconductor device 3, the security server 42 transmits a PUF authentication signal to the system controller 34. As a result, access to the non-volatile memory chips 30 and the logic chips 32 of the semiconductor device 3 is allowed.

The system security fingerprint is a fingerprint matrix obtained by combining the PUF fingerprints of the respective non-volatile memory chips 30 with the PUF fingerprints of the respective logic chips 32. It may be optionally specified whether to generate the fingerprint matrix as a one-dimensional or a two-dimensional fingerprint matrix. The security server 42 may authenticate the PUF pattern of each of the non-volatile memory chips 30 and each of the logic chips 32.

If the security server 42 fails to recognize the semiconductor device 3 with any one of the methods, the security server 42 prohibits access to the semiconductor device 3, for example. In a case where the semiconductor device 3 is disassembled, for example, the semiconductor device 3 is prohibited from operating in another system. The security server 42 may recognize disassembly of the semiconductor device 3. If the semiconductor device 3 recognized to be disassembled requires access, the security server 42 may delete the data of the semiconductor device 3.

Figure 15:
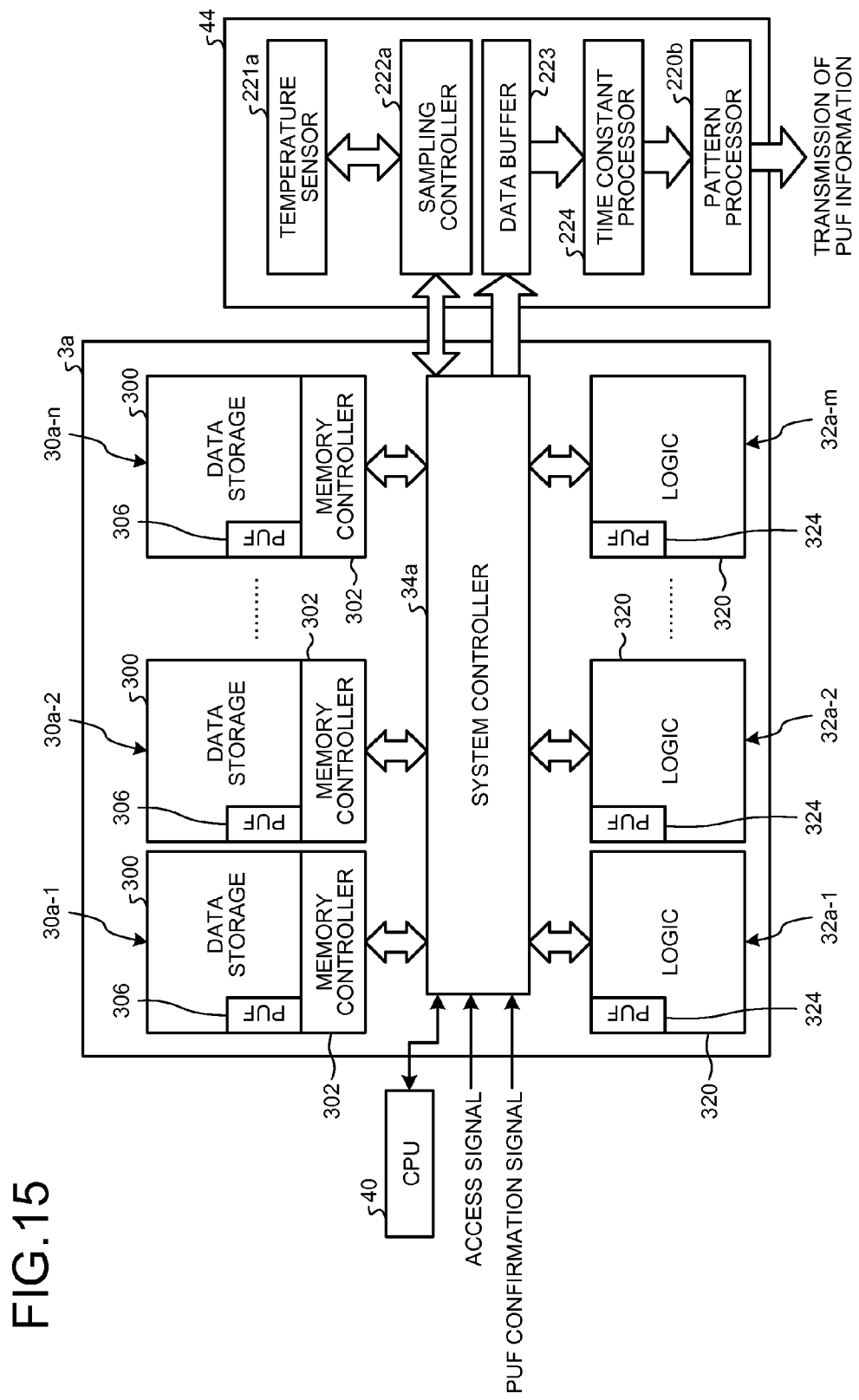
FIG. 15 is a diagram of an exemplary configuration of a modification of the semiconductor device and peripheral equipment.

FIG. 15 is a diagram of an exemplary configuration of a modification (semiconductor device 3a) of the semiconductor device 3 and peripheral equipment. The semiconductor device 3a includes n non-volatile memory chips 30a-1 to 30a-n, m logic chips 32a-1 to 32a-m, and a system controller 34a, for example. In other words, the semiconductor device 3a is a semiconductor system having a multi-chip sealed in one package, for example.

The non-volatile memory chips 30a have a configuration obtained by removing the processor 22a from that of the non-volatile memory chips 30. The logic chips 32a have a configuration obtained by removing the processor 22a from that of the logic chips 32. The system controller 34a controls the units constituting the semiconductor device 3a.

A terminal device 44 includes the temperature sensor 221a, the sampling controller 222a, the data buffer 223, the time constant processor 224, and a pattern processor 220b, for example. The terminal device 44 can communicate with the semiconductor device 3a. The pattern processor 220b generates a PUF pattern of the semiconductor device 3a. The terminal device 44 may be a server capable of communicating with the semiconductor device 3a via a network. Devices capable of communicating with the semiconductor device 3 or the semiconductor device 3a, such as the terminal device 44 and a server, may be referred to as terminal devices.

Figure 16:
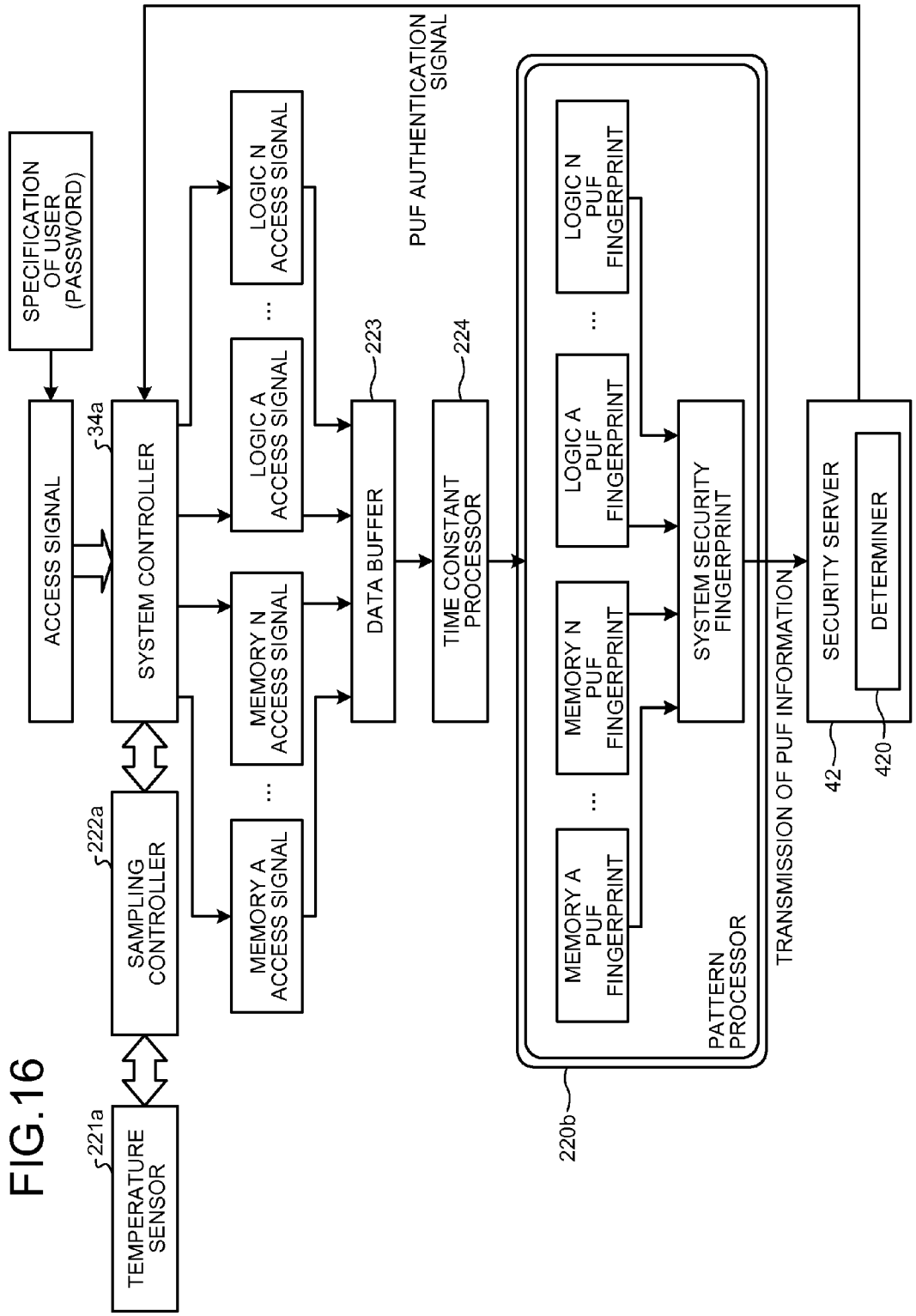
FIG. 16 is a conceptual diagram of an exemplary operation of the semiconductor device illustrated in FIG. 15.

FIG. 16 is a conceptual diagram of an exemplary operation of the semiconductor device 3a illustrated in FIG. 15. When receiving an access signal including a password or the like, the system controller 34a generates a PUF pattern based on a sampling signal received from the sampling controller 222a. The system controller 34a sequentially accesses the non-volatile memory chips 30a and the logic chips 32a the PUF patterns of which are to be generated. The system controller 34a reads the channel currents (access signals of the memories A to N) of the respective unit circuits 100 included in the non-volatile memory chips 30a and the channel currents (access signals of the logics A to N) of the respective unit circuits 100 included in the logic chips 32a. The system controller 34a transmits the channel currents to the terminal device 44.

The data buffer 223 temporarily stores therein the channel currents. The time constant processor 224 performs the processing described in the first exemplary condition, the second exemplary condition, or the third exemplary condition for binarizing the value indicating the unit circuit 100. The time constant processor 224 allocates the values to the respective unit circuits 100, thereby binarizing them.

The pattern processor 220b generates a system security fingerprint of the semiconductor device 3a using the PUF fingerprints of the memories A to N and the PUF fingerprints of the logics A to N. The security server 42 performs authentication using the system security fingerprint. If the security server 42 appropriately authenticates the system security fingerprint of the semiconductor device 3a, the security server 42 transmits a PUF authentication signal to the system controller 34a. As a result, access to the non-volatile memory chips 30a and the logic chips 32a of the semiconductor device 3a is allowed.

Figure 17:
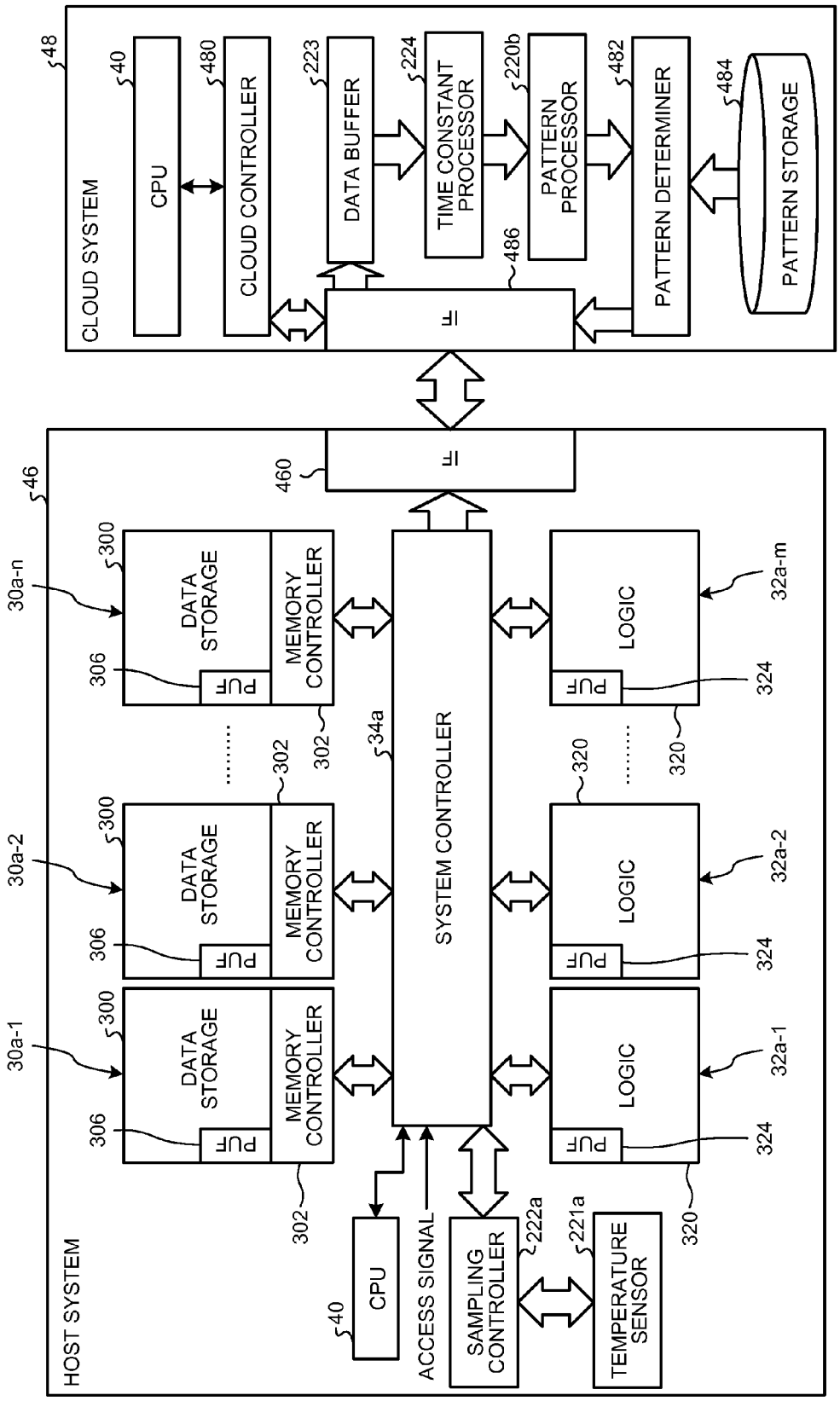
FIG. 17 is a diagram of a first exemplary configuration of an information processing system according to the embodiment.

FIG. 17 is a diagram of a first exemplary configuration of an information processing system according to the embodiment. The information processing system according to the embodiment includes a host system 46 and a cloud system 48 connected to each other via a network, for example.

The host system 46 includes the non-volatile memory chips 30a-1 to 30a-n, the logic chips 32a-1 to 32a-m, the system controller 34a, the CPU 40, the temperature sensor 221a, the sampling controller 222a, and an interface (IF) 460. The IF 460 performs communication with the cloud system 48.

The cloud system 48 includes the CPU 40, a cloud controller 480, the data buffer 223, the time constant processor 224, the pattern processor 220b, a pattern determiner 482, a pattern storage 484, and an IF 486. The IF 486 performs communication with the host system 46.

The cloud controller 480 controls the units constituting the cloud system 48. The pattern determiner 482 compares the PUF pattern output from the pattern processor 220b with a predetermined pattern (pattern registered in advance), thereby determining whether the PUF pattern is identical to the predetermined pattern. The pattern storage 484 is a storage device that stores therein the (preregistered) pattern.

Figure 18:
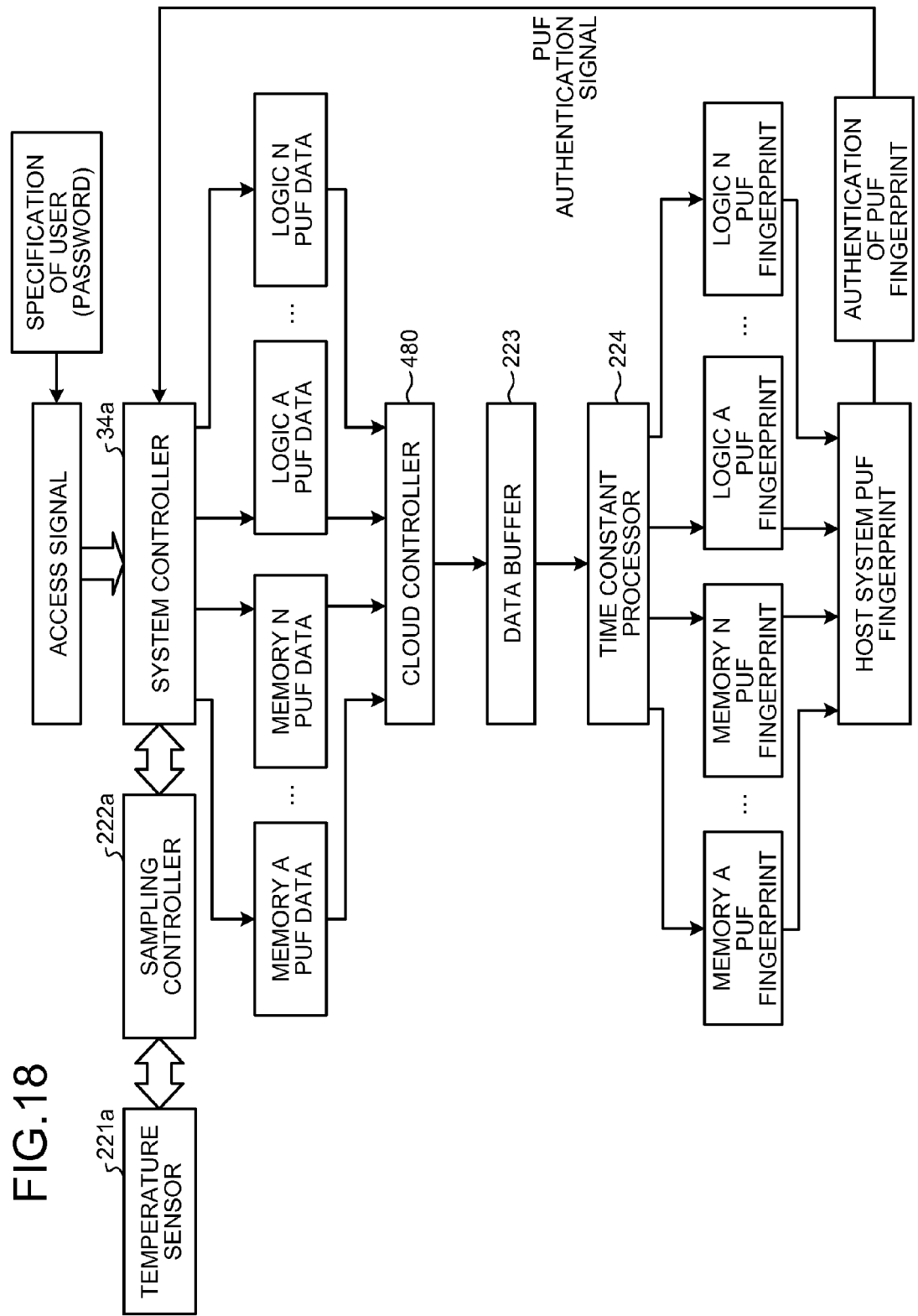
FIG. 18 is a conceptual diagram of an exemplary operation of a host system and a cloud system.

FIG. 18 is a conceptual diagram of an exemplary operation of the host system 46 and the cloud system 48 illustrated in FIG. 17. When receiving an access signal including a password or the like, the system controller 34a generates a PUF pattern based on a sampling signal received from the sampling controller 222a.

The system controller 34a sequentially accesses the non-volatile memory chips 30a and the logic chips 32a the PUF patterns of which are to be generated. The system controller 34a reads the channel currents (access signals of the memories A to N) of the respective unit circuits 100 included in the non-volatile memory chips 30a and the channel currents (access signals of the logics A to N) of the respective unit circuits 100 included in the logic chips 32a. The system controller 34a transmits the channel currents to the cloud system 48 via the IF 460.

The data buffer 223 of the cloud system 48 temporarily stores therein the channel currents transmitted from the host system 46. The time constant processor 224 performs the processing described in the first exemplary condition, the second exemplary condition, or the third exemplary condition for binarizing the value indicating the unit circuit 100. The time constant processor 224 allocates the values to the respective unit circuits 100, thereby binarizing them. The pattern processor 220b generates a host system PUF fingerprint of the host system 46 using the PUF fingerprints of the memories A to N and the PUF fingerprints of the logics A to N.

The pattern determiner 482 compares the host system PUF fingerprint output from the pattern processor 220b with a predetermined pattern (pattern registered in advance), thereby determining whether the host system PUF fingerprint is identical to the predetermined pattern (PUF fingerprint authentication).

If the cloud system 48 appropriately authenticates the host system PUF fingerprint of the host system 46, the cloud system 48 transmits a PUF authentication signal to the system controller 34a. As a result, access to the non-volatile memory chips 30a and the logic chips 32a of the host system 46 is allowed.

Figure 19:
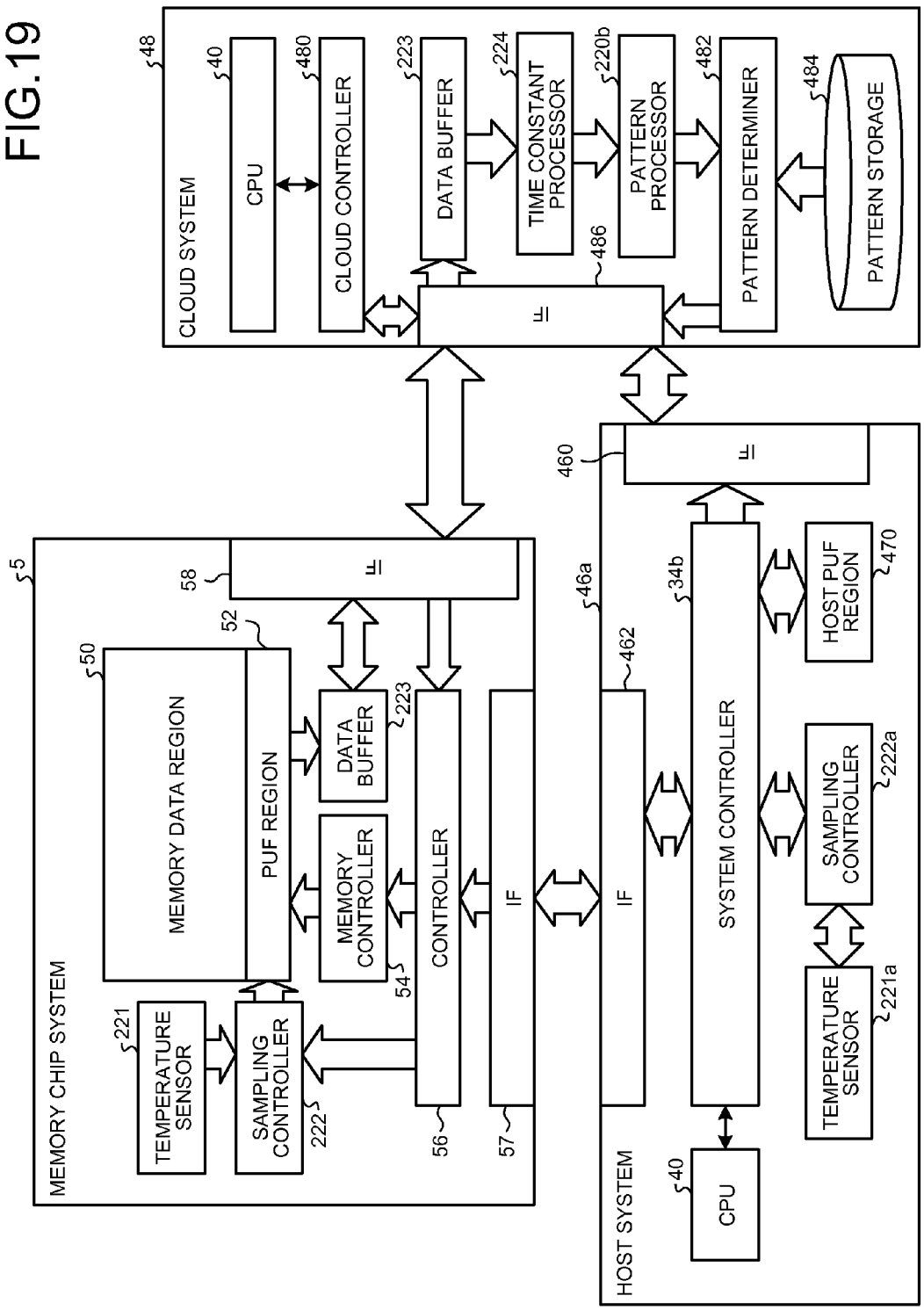
FIG. 19 is a diagram of a second exemplary configuration of the information processing system according to the embodiment.

FIG. 19 is a diagram of a second exemplary configuration of the information processing system according to the embodiment. The information processing system according to the embodiment includes a memory chip system 5, a host system 46a, and the cloud system 48 connected to one another via a network, for example.

The host system 46a includes a system controller 34b, the CPU 40, the temperature sensor 221a, the sampling controller 222a, a host PUF region 470, the IF 460, and an IF 462. The IF 462 performs communication with the memory chip system 5. The system controller 34b controls the units constituting the host system 46a. The host PUF region 470 includes a plurality of unit circuits 100.

The memory chip system 5 is an SD card (registered trademark), for example, and includes a memory data region 50, a PUF region 52, a memory controller 54, the data buffer 223, a controller 56, an IF 57, an IF 58, the temperature sensor 221, and the sampling controller 222.

The memory data region 50 has a plurality of memory cells arranged in an array. Each memory cell included in the memory data region 50 corresponds to the unit circuit 100. The PUF region 52 includes a plurality of unit circuits 100. The memory controller 54 controls the memory data region 50 and the PUF region 52. The controller 56 controls the sampling controller 222 and the memory controller 54.

Figure 20:
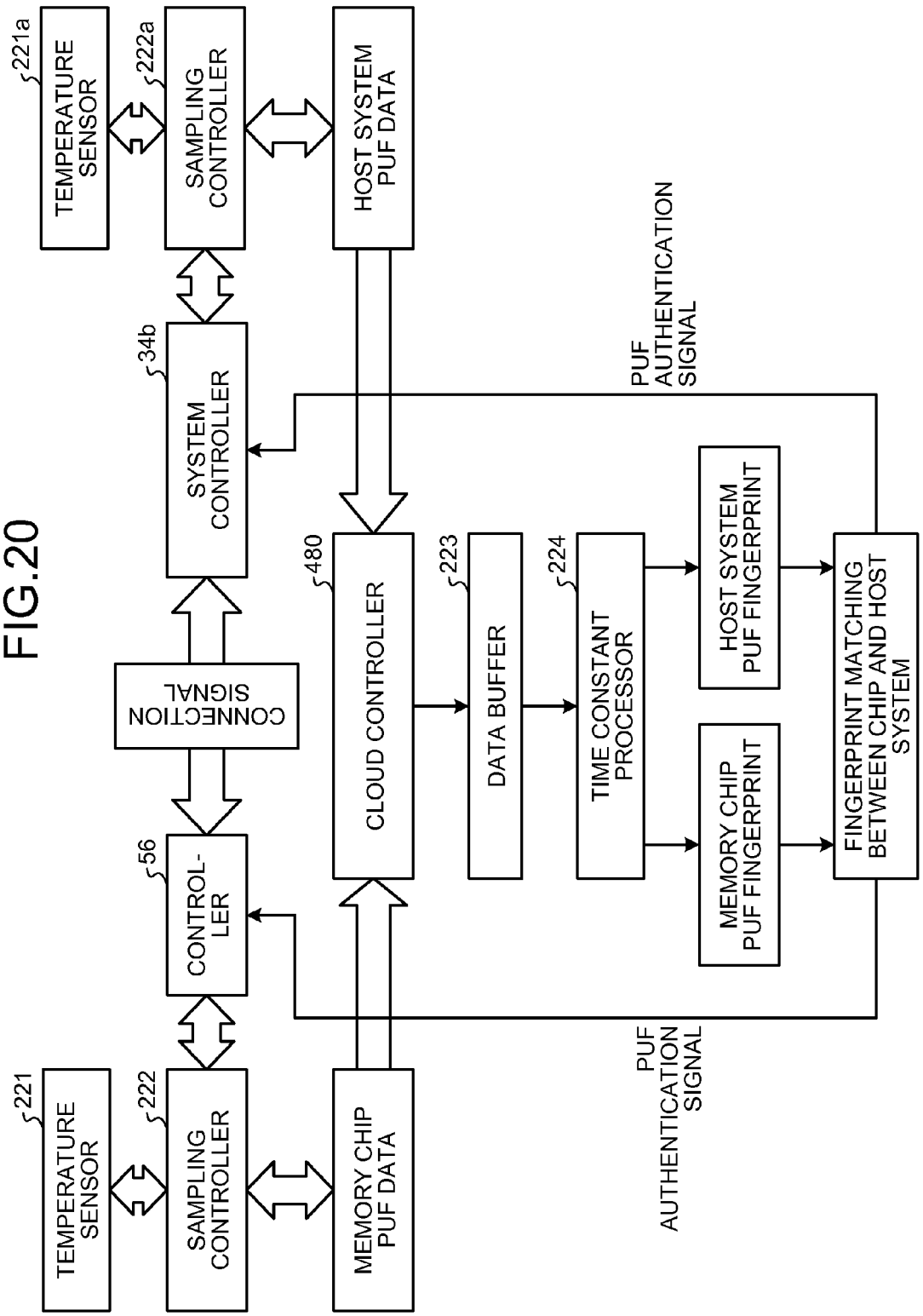
FIG. 20 is a conceptual diagram of a first exemplary operation of a memory chip system, the host system, and the cloud system.

FIG. 20 is a conceptual diagram of a first exemplary operation of the memory chip system 5, the host system 46a, and the cloud system 48 illustrated in FIG. 19. To connect the memory chip system 5 and the host system 46a, the cloud system 48 needs to authenticate authority of the host system 46a to access the memory chip system 5 or authority of the memory chip system 5 to access the host system 46a.

The controller 56 of the memory chip system 5 is connected to the cloud controller 480 of the cloud system 48 to transmit the channel currents of the respective unit circuits 100 in the PUF region 52 (memory chip PUF data) to the cloud controller 480. The data buffer 223 and the time constant processor 224 of the cloud system 48 binarize the memory chip PUF data.

Similarly, the system controller 34b of the host system 46a is connected to the cloud controller 480 of the cloud system 48 to transmit the channel currents of the respective unit circuits 100 in the host PUF region 470 (host system PUF data) to the cloud controller 480. The data buffer 223 and the time constant processor 224 of the cloud system 48 binarize the host system PUF data.

The pattern processor 220b generates a memory chip PUF fingerprint and a host system PUF fingerprint. The pattern determiner 482 performs matching between the memory chip PUF fingerprint and the host system PUF fingerprint. The pattern determiner 482 transmits a PUF authentication signal to the controller 56 via the IF 486. The controller 56 uses the PUF authentication signal, thereby determining whether to permit access of the host system 46a. Furthermore, the pattern determiner 482 transmits a PUF authentication signal to the system controller 34b via the IF 486. The system controller 34b determines whether to permit access of the memory chip system 5. If both the controller 56 and the system controller 34b determine to permit the access, connection signals are transmitted to each other.

Figure 21:
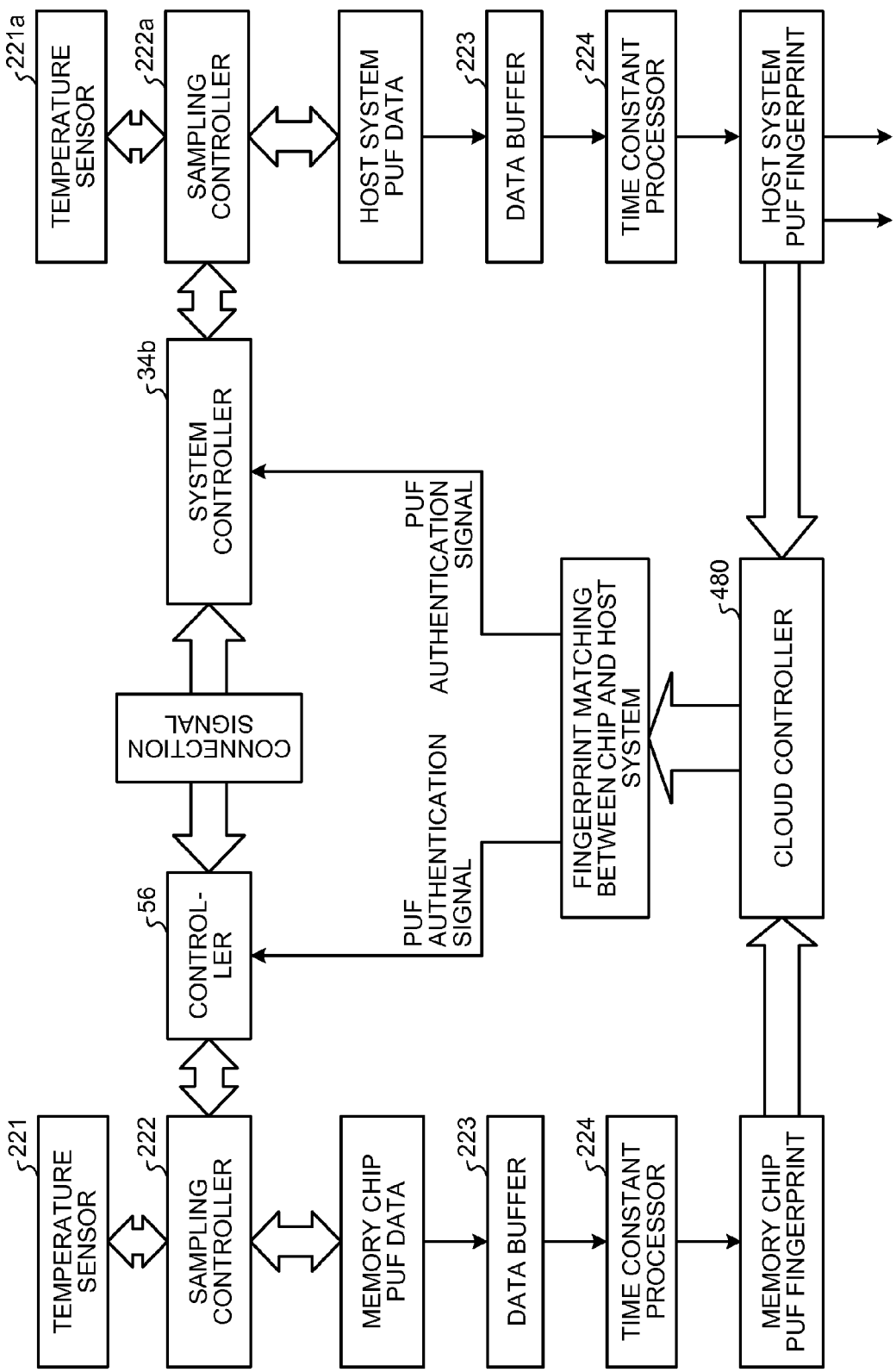
FIG. 21 is a conceptual diagram of a second exemplary operation of the memory chip system, the host system, and the cloud system.

FIG. 21 is a conceptual diagram of a second exemplary operation of the memory chip system 5, the host system 46a, and the cloud system 48. To connect the memory chip system 5 and the host system 46a, the controller 56 temporarily stores the channel currents of the respective unit circuits 100 in the PUF region 52 (memory chip PUF data) in the data buffer 223. The pattern processor 220b generates a PUF fingerprint of the PUF region 52.

Similarly, to connect the memory chip system 5 and the host system 46a, the system controller 34b temporarily stores the channel currents of the respective unit circuits 100 in the host PUF region 470 (host system PUF data) in the data buffer 223. The pattern processor 220b generates a PUF fingerprint of the host PUF region 470.

The memory chip system 5 and the host system 46a may each include the data buffer 223, the time constant processor 224, and the pattern processor 220b. In this case, the memory chip system 5 transmits the memory chip PUF fingerprint to the cloud system 48, and the host system 46a transmits the host system PUF fingerprint to the cloud system 48. The cloud system 48 performs matching between the memory chip PUF fingerprint and the host system PUF fingerprint.

The pattern determiner 482 transmits a PUF authentication signal to the controller 56 via the IF 486. The controller 56 uses the PUF authentication signal, thereby determining whether to permit access of the host system 46a. Furthermore, the pattern determiner 482 transmits a PUF authentication signal to the system controller 34b via the IF 486. The system controller 34b determines whether to permit access of the memory chip system 5. If both the controller 56 and the system controller 34b determine to permit the access, connection signals are transmitted to each other.

As described above, the information processing system according to the embodiment includes the time constant processor and the pattern generator. This configuration can enhance the security using the PUF of the semiconductor device.

An information processing program executed by the information processing system according to the present embodiment is recorded and provided in a computer-readable recording medium, such as a compact disc read only memory (CD-ROM), a flexible disk (FD), a compact disc recordable (CD-R), and a digital versatile disc (DVD), as an installable or executable file.

The information processing program executed by the information processing apparatus according to the present embodiment may be stored in a computer connected to a network, such as the Internet, and provided by being downloaded via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system comprising:
 a time constant processor configured to binarize values indicating unit circuits each including a gate insulating film on the basis of a time to emission indicating a time from when a defect in the gate insulating film captures a carrier in a channel current caused to flow by application of a gate voltage to the unit circuits to when the defect emits the carrier; and
 a pattern generator configured to generate a physical unclonable function pattern unique to the unit circuits using the values binarized by the time constant processor.

2. The system according to claim 1, wherein the time constant processor binarizes the values indicating the respective unit circuits depending on a magnitude relation in each of the unit circuits between a time to capture indicating a time until when the defect in the gate insulating film captures the carrier in the channel current and the time to emission.

3. The system according to claim 1, wherein the time constant processor binarizes the values indicating the respective unit circuits depending on whether the carrier captured by the defect in the gate insulating film is emitted in a predetermined period.

4. The system according to claim 1, wherein the time constant processor binarizes the values indicating the respective unit circuits depending on a magnitude relation in each of the unit circuits between a predetermined value and a difference between the channel current obtained when the defect in the gate insulating film captures the carrier and the channel current obtained when the defect in the gate insulating film emits the carrier.

5. The system according to claim 1, further comprising:
a temperature detector configured to detect temperature around the unit circuits; and
a condition controller configured to change a condition for binarization performed by the time constant processor depending on the temperature detected by the temperature detector.

6. The system according to claim 1, further comprising:
a semiconductor device including the unit circuits; and
a terminal device configured to communicate with the semiconductor device, wherein
the terminal device includes at least one of the time constant processor and the pattern generator.

7. The system according to claim 1, further comprising:
a semiconductor device including the unit circuits; and
a terminal device configured to communicate with the semiconductor device, wherein
the semiconductor device includes at least one of the time constant processor and the pattern generator.

8. The system according to claim 1, further comprising:
a semiconductor device including the unit circuits; and
a terminal device configured to communicate with the semiconductor device and including a determiner configured to determine whether the unique pattern is identical to a predetermined pattern.

9. The system according to claim 1, further comprising:
another semiconductor device including a plurality of unit circuits each including a gate insulating film, wherein
the time constant processor binarizes values indicating the respective second unit circuits, and
the pattern generator generates another pattern unique to the unit circuits of the other semiconductor device using the values indicating the respective unit circuits of the other semiconductor device binarized by the time constant processor.

10. A semiconductor device comprising:
unit circuits each including a gate insulating film;
a time constant processor configured to binarize values indicating the respective unit circuits on the basis of a time to emission indicating a time from when a defect in the gate insulating film captures a carrier in a channel current caused to flow by application of a gate voltage to the unit circuits to when the defect emits the carrier; and
a pattern generator configured to generate a physical unclonable function pattern unique to the unit circuits using the values binarized by the time constant processor.

* * * * *